United States Patent [19]

Zuckerwar et al.

[11] Patent Number: 5,448,904
[45] Date of Patent: Sep. 12, 1995

[54] ACOUSTIC CALIBRATION APPARATUS FOR CALIBRATING PLETHYSMOGRAPHIC ACOUSTIC PRESSURE SENSORS

[75] Inventors: Allan J. Zuckerwar, Newport News; David C. Davis, Grafton, both of Va.

[73] Assignee: The United States of America as represented by the Administrator of the National Aeronautics and Space Administration, Washington, D.C.

[21] Appl. No.: 243,665

[22] Filed: May 11, 1994

[51] Int. Cl.[6] .............................................. G01H 17/00
[52] U.S. Cl. ........................................................ 73/1 DV
[58] Field of Search .......................... 73/1 DV; 367/13

[56] References Cited

U.S. PATENT DOCUMENTS

| | | | |
|---|---|---|---|
| 3,121,211 | 2/1964 | Eskin et al. | 73/1 DV X |
| 3,659,255 | 4/1972 | Trott | 73/1 DV X |
| 3,665,379 | 5/1972 | Trott | 73/1 DV X |
| 3,864,664 | 2/1975 | Trott et al. | 73/1 DV X |
| 4,039,767 | 8/1977 | Leschek | 181/140 X |
| 4,205,394 | 5/1980 | Pickens | 367/13 |
| 4,286,455 | 9/1981 | Ophir et al. | 73/1 DV |
| 4,375,579 | 3/1983 | Park, Jr. et al. | 73/1 DV X |
| 4,390,026 | 6/1983 | Christman | 128/736 X |
| 4,403,508 | 9/1983 | Langlois | 73/589 |
| 4,406,153 | 9/1983 | Ophir et al. | 73/1 DV |
| 4,434,648 | 3/1984 | Drost et al. | 73/1 DV |
| 4,441,173 | 4/1984 | McEachern | 367/13 |
| 4,501,151 | 2/1985 | Christman | 73/646 |
| 4,518,992 | 5/1985 | Kessler et al. | 73/606 X |
| 4,838,070 | 6/1989 | Bradley | 73/1 DV |
| 5,052,934 | 10/1991 | Carey et al. | 434/268 |
| 5,097,512 | 3/1992 | Batey | 73/1 DV X |

*Primary Examiner*—Thomas P. Noland
*Attorney, Agent, or Firm*—Kimberly A. Chasteen

[57] ABSTRACT

An apparatus for calibrating an acoustic sensor. The apparatus includes a transmission material having an acoustic impedance approximately matching the acoustic impedance of the actual acoustic medium existing when the acoustic sensor is applied in actual in-service conditions. An elastic container holds the transmission material. A first sensor is coupled to the container at a first location on the container and a second sensor coupled to the container at a second location on the container, the second location being different from the first location. A sound producing device is coupled to the container and transmits acoustic signals inside the container.

12 Claims, 1 Drawing Sheet

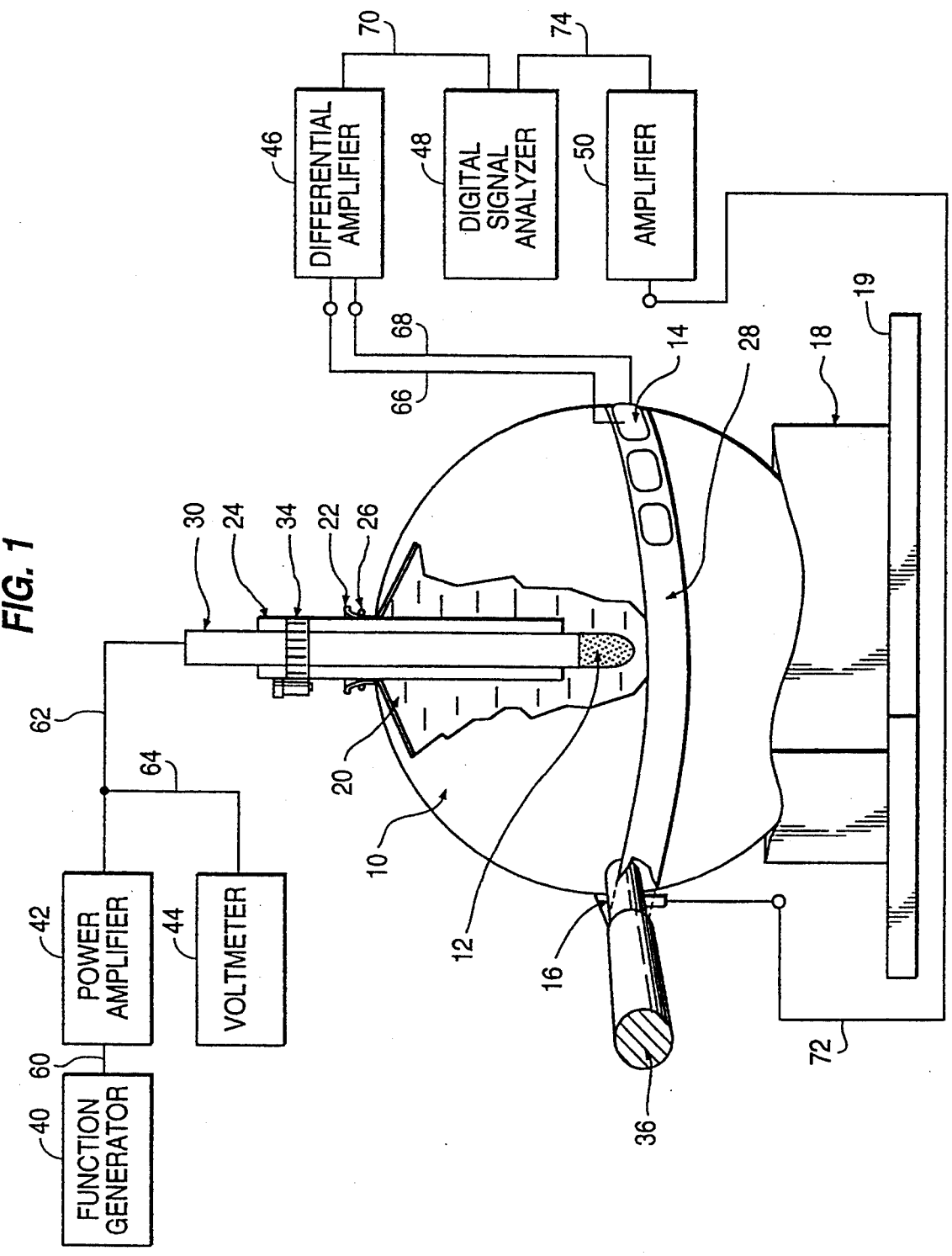

ACOUSTIC CALIBRATION APPARATUS FOR CALIBRATING PLETHYSMOGRAPHIC ACOUSTIC PRESSURE SENSORS

ORIGIN OF THE INVENTION

The invention described herein was made by employees of the U.S. Government and may be manufactured and used by or for the government for governmental purposes, without the payment of any royalties thereon or therefor.

BACKGROUND OF THE INVENTION

1. Field of the Invention

The present invention relates to plethysmographic sensors and, more particularly, to a method and apparatus of calibrating plethysmographic sensors.

2. Description of the Related Art

Many plethysmographic instruments utilize plethysmographic sensors to measure blood flow, blood pressure, heart rate, breathing sounds, or other such functions, on the surface of the human body.

Examples of plethysmographic sensors or devices which use these type of sensors are disclosed in Baker, U.S. Pat. No. 4,781,200—Ambulatory Non-Invasive Automatic Fetal Monitoring System; Pfohl, U.S. Pat. No. 4,981,139—Vital Signs Monitoring and Communication System; Dickson, U.S. Pat. No. 4,458,687—Trans-Telephonic Acoustical and Electrical Heart Valve Monitor System; Kroll, U.S. Pat. No. 4,672,976—Heart Sound Sensor; Kroll, et al., U.S. Pat. No. 4,763,660—Flexible and Disposable Electrode Belt Device; Flowers, U.S. Pat. No. 4,258,720—Strain Gauge Plethysmograph; and Shirley, et al., U.S. Pat. No. 4,784,154—Interference Resistant Biomedical Transducer.

Plethysmographic sensors include acoustical pressure sensors.

Various problems occur in providing calibration of plethysmographic acoustical pressure sensors so that the calibration proves to be accurate and reliable when the sensors are applied in actual in-service conditions. Typically, the calibration of a plethysmographic acoustical pressure sensor loses its validity when the sensor is removed from the calibration facility and installed into actual in-service conditions. This problem generally occurs if the specific acoustic impedance of the plethysmographic acoustic pressure sensor is not substantially higher than the specific acoustic impedance of the calibration transmission medium and the specific acoustic impedance of the actual in-service transmission medium.

The transmission medium of most plethysmographic acoustic pressure sensors is human tissue, which may be assumed to have a specific acoustic impedance near that of water. If the specific acoustic impedance of the plethysmographic acoustic pressure sensor is not substantially higher than that of water, then the calibration must take place in a medium having a specific acoustic impedance comparable to that of water in order to match the environmental conditions of calibration to the environmental conditions of actual in-service use. This matching of environmental conditions poses a difficult problem for conventional calibration techniques.

Also, actual in-service conditions require that the plethysmographic sensors are mounted by a strap which is wrapped around the torso or a limb, or are applied independently. Therefore, the mounting condition of the plethysmographic acoustical pressure sensor in calibration should match the mounting conditions of actual service.

Conventional methods of calibrating plethysmographic acoustical pressure sensors include the acoustical coupler, the reverberation chamber, and the free field.

The acoustical coupler consists of a small rigid chamber with sealed ports to seat a sound source, a reference sensor, and the test sensor. The internal volume contains either a gas (air) or a liquid (water) and has dimensions which are much smaller than an acoustical wavelength, thus assuring uniform acoustical pressure throughout the volume. Acoustic pressures generated by the sound source are measured by the test and reference sensors and a comparison of the measurements provides the basis for the calibration. A calibration in a conventional acoustic coupler does not meet the mounting requirements of actual in-service conditions.

The reverberation chamber contains the same components as the acoustical coupler, except that the volume dimensions of a reverberation chamber are much larger than an acoustical wavelength and generally large enough to contain the test and reference sensors. Irregular reflections from the chamber walls generate a uniform sound energy density and insure that the test and reference sensors are subjected to the same sound pressure levels.

A free field calibration takes place in a very large volume (for example, the atmosphere, a lake, or an ocean) or in an anechoic chamber, such that the sound field is undisturbed by reflections. In this situation, a calibrated sound source generates a known sound pressure at a distance where the test sensor is located.

Accurate and reliable calibration in a reverberation chamber or free field in water is possible with the test sensor mounted similarly to in-service conditions. However, this procedure requires that the test sensor be submerged in water. This submersion may prove destructive since many plethysmographic acoustic pressure sensors are not hermetically sealed. As an example, Schanz and Schilling (Acustica, vol. 65, pp. 267-298 (1988)) describe a free field reciprocity method of calibrating PVDF-foil sensors, but the method requires the immersion of the sensor in a tank of water.

Further, an acoustical wavelength in water at, for example, 20 Hz is approximately 74 m and the required expanse of the free field must be several times an acoustic wavelength. Therefore, this method may prove impractical.

SUMMARY OF THE INVENTION

Accordingly, it is an object of the present invention to provide reliable and accurate calibration of pressure sensitivity and frequency response of surface mounted plethysmographic sensors.

It is a further object to provide a calibration apparatus in which (1) the transmission medium has an acoustical impedance matching that of human tissue (water), (2) the sensor installation conforms to that in actual service conditions, and (3) immersion of the sensor in water or other liquid is avoided.

Additional objects and advantages of the invention will be set forth in part in the description which follows and, in part, will be obvious from the description, or may be learned by practice of the invention.

The foregoing objects of the invention are achieved by providing an apparatus for calibrating an acoustic sensor which is coupled to an actual acoustic medium when used in actual in-service conditions, comprising a transmission material having an acoustic impedance approximately matching the acoustic impedance of the actual acoustic medium, an elastic container which holds the transmission material, a first sensor which is coupled to the container at a first location on the container, a second sensor which is coupled to the container at a second location on the container, the second location being different from the first location, and a sound producing device which is coupled to the container and transmits acoustic signals inside the container.

BRIEF DESCRIPTION OF THE DRAWINGS

These and other objects and advantages of the invention will become apparent and more readily appreciated from the following description of the preferred embodiments, taken in conjunction with the accompanying FIG. 1, which is a diagram of an acoustic calibration apparatus according to an embodiment of the present invention.

DETAILED DESCRIPTION OF THE PREFERRED EMBODIMENTS

Reference will now be made in detail to the present preferred embodiments of the present invention, examples of which are illustrated in the accompanying drawing, wherein like reference numerals refer to like elements throughout.

FIG. 1 illustrates an acoustic calibration apparatus according to an embodiment of the present invention. The acoustic calibration apparatus comprises a balloon 10, a sound source 12, a test sensor 14, a reference sensor 16 and a suspension device 18. Balloon 10 acts as a container and is filled with water 20. Sound generated by sound source 12, located at the center of balloon 10, propagates through water 20 and impinges upon both test sensor 14 and reference sensor 16. The sensitivity of reference sensor 16 is known. Therefore, the sensitivity of the test sensor 14 can be derived by comparison between measurements of test sensor 14 and reference sensor 16.

The water-filled balloon 10 typically is made of 150-micron thick vinyl and has a diameter of 0.3–0.4 m. A neck 22 of balloon 10 is opened to accommodate a tube 24 (preferably made of aluminum), which seats sound source 12 in the center of balloon 10. An O-ring 26 presses neck 22 against tube 24, thus providing a seal. A tight seal is not necessary for successful operation of the acoustic calibration apparatus, however, a tight seal operates to retain the position of sound source 12 relative to the center of balloon 10.

In the present embodiment of the present invention, test sensor 14 is mounted on a cummerbund 28 which is preferably wrapped around the equator of balloon 10 so that test sensor 14 is in direct contact with the vinyl surface of balloon 10. While FIG. 1 illustrates test sensor 14 mounted on cummerbund 28, it is appreciated by persons skilled in the art that there are various other methods to mount test sensor 14. However, test sensor 14 should be mounted in a manner which conforms to mounting used in actual in-service conditions. For example, test sensor 14 could be mounted to balloon 10 with a piece of adhesive tape.

Ambient vibrations generate pressure waves in water 20. Therefore, balloon 10 is supported on a suspension device 18 to reduce the contaminating effects of vibrations on input signals to test sensor 14 and reference sensor 16. Suspension device 18 is, for example, a foam pad and resides on a base 19.

Sound source 12 is typically a hydrophone serving as an acoustic projector. An example of a suitable hydrophone is an LC-32 manufactured by Atlantic Research Corp. A barrel 30 of sound source 12 is clamped to tube 24 by a clamp 34 in order to fix the position of sound source 12. Clamp 34 is, for example, a conventional hose clamp. Tube 24 itself is supported by a stable fixture (not illustrated).

At acoustical frequencies below 20 kHz, sound source 12 radiates sound isotropically throughout balloon 10 so that the sound pressure levels at test sensor 14 and reference sensor 16 are equal.

The acoustic field inside balloon 10 is reverberant and composed of multiple reflections. Therefore, the sound pressure at test sensor 14 and reference sensor 16 cannot be reliably inferred from the characteristics of sound source 12. For this reason, reference sensor 16, having known calibration, is positioned on the surface of balloon 10. Reference sensor 16 should present a very high acoustic impedance to the acoustic field in order to ensure that the sound pressure at the face of reference sensor 16 is approximately twice the incident pressure.

A high acoustic impedance can be realized if reference sensor 16 utilizes a high specific acoustic impedance material (for example, a piezoelectric ceramic) and is mounted with sufficient rigidity to resist displacement by the incident acoustic pressure. A sufficiently rigid mount can be achieved, for example, by pressing a massive bar 36 against reference sensor 16. As illustrated in FIG. 1, test sensor 14 is mounted on cummerbund 28. Therefore, it is preferable that reference sensor 16 is placed between cummerbund 28 and balloon 10. Massive bar 36 presses against reference sensor 16 through cummerbund 28.

Supporting instrumentation is used for driving sound source 12, detecting the level of excitation detected by reference sensor 16 and test sensor 14, and comparing the levels of excitation of reference sensor 12 and test sensor 14. Supporting instrumentation includes a function generator 40, a power amplifier 42, a voltmeter 44, a differential amplifier 46, a digital signal analyzer 48 and an amplifier 50, although many other combinations of supporting equipment are easily recognized and used by persons skilled in the art.

Sound source 12 is excited by function generator 40 and power amplifier 42, preferably in a continuous-wave, single-frequency mode. Background signals due to ambient vibrations are generally so large that the use of a gated pulse technique is precluded. The output of function generator 40 is connected to power amplifier 42 via line 60 and power amplifier 42 is connected to sound source 12 via line 62. Voltmeter 44 is connected to the output of power amplifier 42 via line 64 and indicates the level of excitation.

Test sensor 14 may be single-ended or differential. If test sensor 14 is differential, then the test sensor signal is amplified in differential amplifier 46 and measured on a voltage-reading instrument, such as digital signal analyzer 48. If test sensor 14 is single-ended, then a single ended amplifier will be used in place of differential amplifier 46. Reference sensor 16 is generally single-ended and its output signal is amplified by single-ended amplifier 50 and measured on a voltage-reading instrument (not illustrated). The output of reference sensor 16 can be amplified by amplifier 50 and read by digital signal analyzer 48 if digital signal analyzer 48 is dual-channeled.

Test sensor 14 is connected to differential amplifier 46 via lines 66 and 68. Differential amplifier 46 is connected to digital signal analyzer 48 via line 70.

Reference sensor 16 is connected to amplifier 50 via line 72 and amplifier 50 connects to digital signal analyzer 48 via line 74.

The procedure for obtaining a frequency response calibration of test sensor 14 is as follows. The frequency of function generator 40 is selected for a continuous wave (CW) signal. The respective gains of differential amplifier 46 and amplifier 50 are adjusted to facilitate the measurement of test sensor 14 and reference sensor 16 on digital signal analyzer 48. The sensitivity of test sensor 14 is the test sensor output voltage (divided by the gain of differential amplifier 46) divided by the measured sound pressure derived from the calibrated response of reference sensor 16. A series of such measurements at selected frequencies will yield the frequency response of test sensor 14.

A hydrophone used as sound source 12 radiates electromagnetic signals as well as acoustical signals, as is well-known in the art. The electromagnetic interference (EMI) signals will be detected by a test sensor having a high electrical impedance. A piezoelectric sensor is an example of such a test sensor. The EMI signals are generally of far greater amplitude than the acoustic pressure signals. Suppression of the EMI signals requires that the test sensor or hydrophone be completely surrounded by an electrical shield which is connected to earth ground. This can be accomplished by any of three methods.

First, if the test sensor already has a built-in electrical shield, then this shield must be connected to earth ground.

Second, in the absence of a built-in shield, a layer of copper-coated kapton foil wrapped around the test sensor will provide effective shielding if the copper is connected to earth ground. The presence of the foil will not affect acoustical propagation to the test sensor.

Finally, the vinyl balloon 10 can be coated with a thin metallic layer connected to earth ground. This will not affect the acoustic propagation to the test sensor, but will suppress EMI signals propagating beyond the confines of the balloon wall.

Sound source 12 can be any transducer capable of projecting sound underwater, such as, for example, a magnetostrictive transducer. Further, sound source 12 need not be located at the center of balloon 10, but rather can be located at the distal end of tube 24 (outside balloon 10). In this case, tube 24 would serve as a waveguide.

The transmission medium (water) has an acoustic impedance closely matching that of human tissue. However, test sensor 14 remains outside the medium during the calibration procedure. Therefore, there is no need to immerse test sensor 14. This is an important aspect of the present invention, since many test sensors are not hermetically sealed.

The present invention has the advantage that test sensor 14 can be installed on balloon 10 in a manner conforming to that in actual in-service conditions. Thus, when test sensor 14 is removed from the calibration apparatus, the calibration of test sensor 14 remains valid when test sensor 14 is reinstalled for use in actual in-service conditions.

The calibration method utilizes water as the propagation medium to simulate human tissue; however, the test sensor remains outside the propagation medium. This feature is important if the test sensor is not hermetically sealed.

The calibration method permits a test sensor installation corresponding to the actual in-service condition. As a result, the calibration remains valid when the test sensor is removed from the acoustic calibration apparatus and reinstalled for service.

The present embodiments of the present invention use balloon 10 as a container to hold water 20; however, a container other than a balloon can be used in the present invention. The container should have a low acoustic impedance and a high elasticity. Such a container should preferably have an elastic modulus approximately equal to the elastic modulus of soft rubber, which is approximately $0.0005 \times 10^{10}$ N/m². The container could also be selected so as to have an elastic modulus not exceeding approximately 10% of the bulk modulus of water (which is approximately $2 \times 10^9$ N/m²). Therefore, the container should be selected to have an elastic modulus not exceeding approximately $2 \times 10^8$ N/m².

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for calibrating an acoustic sensor which is coupled to an actual acoustic medium when used in actual in-service conditions, comprising:
   a transmission material having an acoustic impedance approximately matching the acoustic impedance of the actual acoustic medium;
   a balloon which holds the transmission material;
   a first sensor which is coupled to the balloon at a first location on the balloon;
   a second sensor which is coupled to the balloon at a second location on the balloon, the second location being different from the first location; and
   a sound producing device which is coupled to the balloon and transmits acoustic signals inside the balloon.

2. An apparatus as in claim 1, wherein the balloon has an elastic modulus approximately equal to the elastic modulus of soft rubber.

3. An apparatus as in claim 1, wherein the container has an elastic modulus not exceeding approximately $2 \times 10^8$ N/m².

4. An apparatus for calibrating an acoustic sensor which is coupled to an actual acoustic medium when used in actual in-service conditions, comprising:
   a transmission material having an acoustic impedance approximately matching the acoustic impedance of the actual acoustic medium;
   an elastic container having an elastic modulus not exceeding approximately $2 \times 10^8$ N/m² which holds the transmission material;
   a first sensor which is coupled to the container at a first location on the container;
   a second sensor which is coupled to the container at a second location on the container, the second location being different from the first location; and a sound producing device which is coupled to the container and transmits acoustic signals inside the container.

5. An apparatus as in claim 4, further comprising coupling means for coupling the second sensor to the container, the coupling means using substantially the same coupling structure as is used when the second sensor is coupled to the actual acoustic medium in actual in-service conditions.

6. An apparatus as in claim 4, wherein the second sensor is coupled to the container with the use of a cummerbund.

7. An apparatus as in claim 4, wherein the second sensor is coupled to the container by being held in position with tape.

8. An apparatus as in claim 4, wherein the transmission material is substantially water.

9. An apparatus as in claim 4, wherein the sound producing device radiates sound isotropically throughout the container.

10. An apparatus as in claim 4, wherein the sound producing device includes a hydrophone.

11. An apparatus as in claim 4, further comprising supporting means, coupled to the container, for supporting the container so as to reduce contaminating effects of vibrations caused by the ambient environment.

12. An apparatus as in claim 4, wherein the first sensor utilizes a high specific acoustic impedance material and is mounted with sufficient rigidity to resist displacement by the incident acoustic pressure.

* * * * *